(12) United States Patent
Owens et al.

(10) Patent No.: US 12,490,140 B2
(45) Date of Patent: Dec. 2, 2025

(54) AUTOMATED DEACTIVATION MODULE FOR TELEMATICS SUBSCRIPTION SERVICE IN A VEHICLE

(71) Applicant: GM GLOBAL TECHNOLOGY OPERATIONS LLC, Detroit, MI (US)

(72) Inventors: Kevin W. Owens, Sterling Heights, MI (US); Eric T. Hosey, Royal Oak, MI (US); James Doherty, Canton, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 468 days.

(21) Appl. No.: 18/082,004

(22) Filed: Dec. 15, 2022

(65) Prior Publication Data

US 2024/0205731 A1  Jun. 20, 2024

(51) Int. Cl.
*H04W 28/02* (2009.01)
*B60L 58/12* (2019.01)
*H04W 28/24* (2009.01)

(52) U.S. Cl.
CPC ......... *H04W 28/0268* (2013.01); *B60L 58/12* (2019.02); *H04W 28/0231* (2013.01); *H04W 28/24* (2013.01)

(58) Field of Classification Search
CPC ............. H04W 28/24; H04W 28/0268; H04W 28/0231; B60L 58/12
See application file for complete search history.

(56) References Cited

U.S. PATENT DOCUMENTS

| | | | | |
|---|---|---|---|---|
| 10,509,095 | B1* | 12/2019 | Kim | G07C 5/008 |
| 2007/0142028 | A1* | 6/2007 | Ayoub | H04M 11/04 |
| | | | | 455/404.1 |
| 2013/0117453 | A1* | 5/2013 | Bjerke | G06F 9/00 |
| | | | | 709/226 |
| 2014/0146812 | A1* | 5/2014 | Qiu | H04L 65/1073 |
| | | | | 370/352 |
| 2015/0124718 | A1* | 5/2015 | Molinero Fernandez | |
| | | | | H04L 65/1016 |
| | | | | 370/329 |
| 2021/0125254 | A1* | 4/2021 | O'Neill | G06Q 30/0282 |
| 2022/0110015 | A1* | 4/2022 | Krishnamurthy | |
| | | | | H04W 72/0453 |
| 2023/0325860 | A1* | 10/2023 | Waishampayan | G06F 16/955 |
| | | | | 705/7.34 |
| 2024/0172227 | A1* | 5/2024 | Esswie | H04L 5/006 |

* cited by examiner

*Primary Examiner* — Jason E Mattis
*Assistant Examiner* — Bao G Nguyen
(74) *Attorney, Agent, or Firm* — Quinn IP Law

(57) ABSTRACT

A system for managing communication between a vehicle and remote assistance unit includes a telematics unit connected to the vehicle. The telematics unit is engaged in a subscription service with the remote assistance unit. A command unit is in communication with the telematics unit, the command unit having a processor and tangible, non-transitory memory on which instructions are recorded. The command unit is adapted to determine if one or more deactivation conditions for the subscription service are met. Respective severity values for the deactivation conditions are determined. The command unit is adapted to calculate a cumulative severity index based in part on the respective severity values. An automated deactivation module is executed for the subscription service when the cumulative severity index exceeds a predefined severity threshold.

14 Claims, 3 Drawing Sheets

AUTOMATED DEACTIVATION MODULE FOR TELEMATICS SUBSCRIPTION SERVICE IN A VEHICLE

INTRODUCTION

The present disclosure relates generally to a system and method for managing communication between a vehicle and a remote assistance unit. More specifically, the present disclosure relates to an automated deactivation module for a telematics subscription service in a vehicle. Telematics is the provision of communications services to vehicles, such as navigation, various notifications, and traffic information. Given that vehicles may be scattered across remote locations and have communication devices with resource constraints or limited network bandwidth, it may be challenging for a vehicle to maintain a network connection. Generally, telematics systems are unable to deactivate a telematics unit without connecting to the vehicle.

SUMMARY

Disclosed herein is a system for managing communication between a vehicle and a remote assistance unit. The system includes a telematics unit connected to the vehicle, the telematics unit being engaged in a subscription service with the remote assistance unit. A command unit is in communication with the telematics unit, the command unit having a processor and tangible, non-transitory memory on which instructions are recorded. The command unit is adapted to determine if one or more deactivation conditions for the subscription service are met. Respective severity values for the deactivation conditions are determined. The command unit is adapted to calculate a cumulative severity index based in part on the respective severity values. An automated deactivation module is executed for the subscription service when the cumulative severity index exceeds a predefined severity threshold.

The command unit may be adapted to assign a respective weighting factor to the one or more deactivation conditions and obtain the cumulative severity index as a weighted sum of the respective severity values. The deactivation conditions may include at least one of: expiry of an end-of-life certificate, and expiry of a connected state timer and/or service agreement.

The deactivation conditions may include at least one of: an age of the vehicle exceeding a maximum, and damage to hardware in the vehicle, the hardware including at least one antenna. The deactivation conditions may include at least one of: absence of a cellular service state and/or a radiofrequency band in the vehicle for a predefined period, lack of usage of vehicle connectivity features, including Bluetooth™ and/or Hotspot, and failure of the telematics unit to register with a network for a predefined extended time.

The deactivation conditions may include at least one of: the vehicle being in an ignition-off state and/or disconnected battery state for a predefined extended time, and the vehicle being restricted within a geographical boundary for a predefined length of time while the vehicle has travelled a minimum distance during the predefined length of time. The deactivation conditions may include at least one of: presence of a network rejection flag for a predetermined time duration, presence of one or more permanent rejection flags, and a number of deactivation attempts for the vehicle exceeding a predetermined quantity.

The command unit may be adapted to initiate the automated deactivation module by relaying a deactivation message in the vehicle and determine if the deactivation message was accepted by a user and/or a networking device in the vehicle. In one embodiment, the command unit is adapted to attempt a non-stealth call to the vehicle when the deactivation message is accepted and determine if the non-stealth call is successful. The command unit may be adapted to permit the remote assistance unit to determine disposition of the deactivation when the non-stealth call is successful and locally deactivate subscription service in the vehicle when the non-stealth call is not successful.

The command unit may be adapted to increase a deactivation request counter when the deactivation message is not accepted and determine whether the deactivation request counter exceeds a predefined counter threshold. In one embodiment, the command unit is adapted to place a stealth call to the vehicle when the deactivation request counter exceeds the predefined counter threshold and begin a timer when the deactivation request counter does not exceed the predefined counter threshold. When the timer has expired, the command unit may be adapted to reassess if one or more deactivation conditions for the subscription service are met. The command unit may be adapted to permit disposition of the subscription service to be determined by the remote assistance unit when the stealth call is successful and display a forced deactivation message and locally deactivate the telematics unit when the stealth call is not successful.

Disclosed herein is a method of managing communication between a vehicle and a remote assistance unit. The method includes installing a telematics unit in the vehicle. The telematics unit is engaged in a subscription service with the remote assistance unit. The method includes communicating with a command unit via the telematics unit, the command unit having a processor and tangible, non-transitory memory on which instructions are recorded. The method includes determining if one or more deactivation conditions for the subscription service are met, via the command unit.

The method includes determining respective severity values for the one or more deactivation conditions and calculating a cumulative severity index based in part on the respective severity values, via the command unit. An automated deactivation module is executed for the subscription service when the cumulative severity index exceeds a predefined severity threshold via the command unit.

The above features and advantages and other features and advantages of the present disclosure are readily apparent from the following detailed description of the best modes for carrying out the disclosure when taken in connection with the accompanying drawings.

Figure 1:
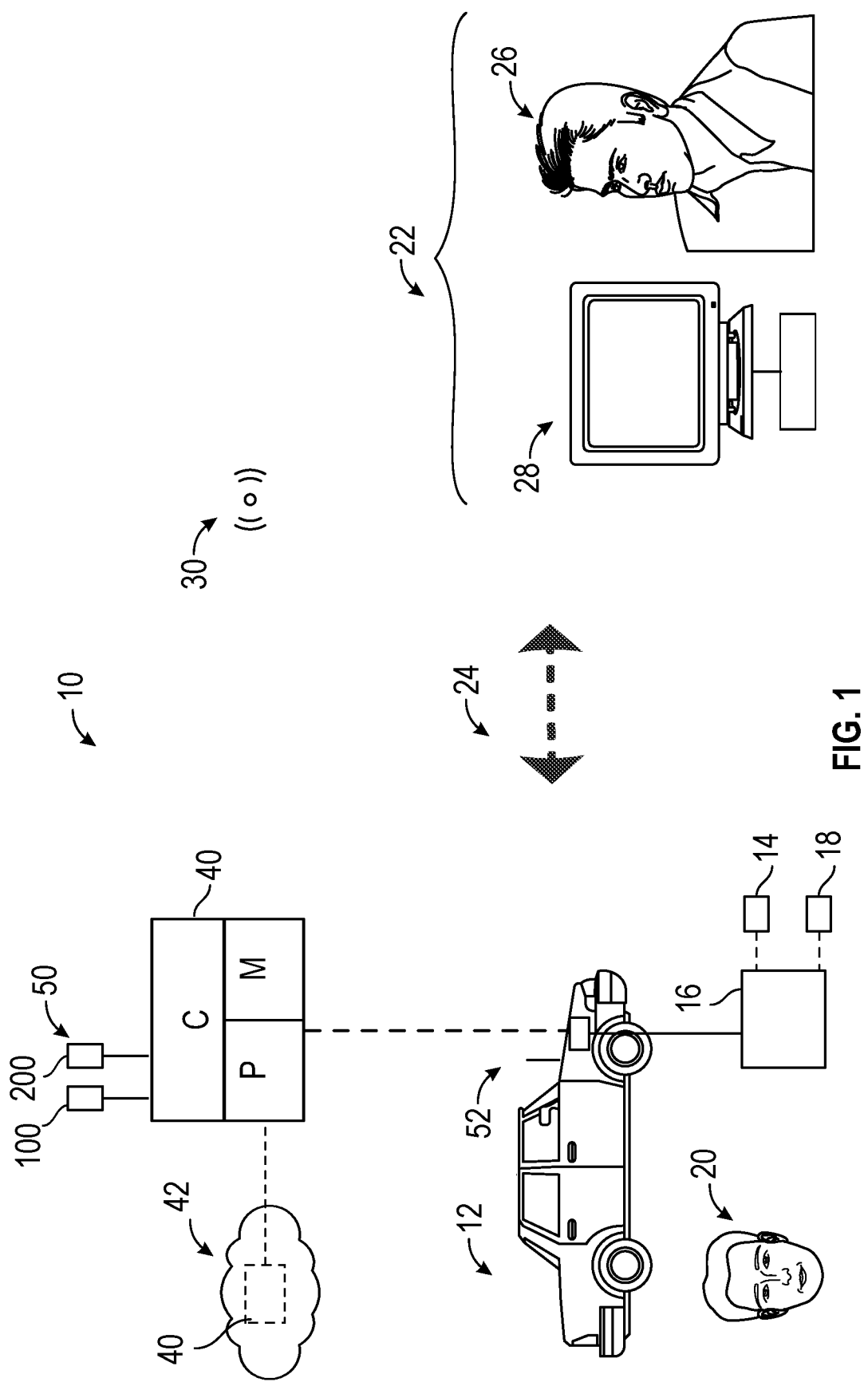
FIG. 1 is a schematic fragmentary diagram of a system for managing communications in a vehicle, the system having a command unit.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for managing communications in a vehicle 12 having a telematics unit 14. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components.

Referring to FIG. 1, the vehicle 12 includes a communications device, referred to herein as a telematics unit 14, that is capable of carrying out wireless data communications. The telematics unit 14 is accessible to a vehicle controller 16. The telematics unit 14 may collect data pertaining to the vehicle 12, such as location, speed, engine data, maintenance requirements and servicing, by interfacing with various internal sub-systems. The telematics unit 14 may enable vehicle-to-vehicle (V2V) communication and/or a vehicle-to-everything (V2X) communication. In some embodiments, the vehicle 12 may communicate through a mobile device 18.

Referring to FIG. 1, a user 20 in the vehicle 12 may establish communication with a remote assistance unit 22 through the telematics unit 14. The telematics unit 14 may engage with the remote assistance unit 22 based on a service connection, referred to herein as subscription service 24. The remote assistance unit 22 may provide subscription service-based communications such as in-vehicle services, turn-by-turn navigation, tracking and other services. In one embodiment, the remote assistance unit 22 is OnStar™. The remote assistance unit 22 may be manned electronically and/or by a remote advisor 26 having access to an electronic device 28 such as a desktop computer, laptop, tablet, cell phone or wearable device. The remote assistance unit 22 may include one or more servers that each include a processing device and a memory device and at least one database that includes vehicle information.

Referring to FIG. 1, the telematics unit 14 may access a wireless network 30 to connect with the remote assistance unit 22. The wireless network 30 may be a short-range network or a long-range network. The wireless network 30 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. The wireless network 30 may be a serial communication bus in the form of a local area network, Ethernet, Bluetooth, WIFI and other forms of data. Other types of network technologies or carrier systems available to those skilled in the art may be employed.

Referring to FIG. 1, the system 10 includes a command unit 40 having an integrated controller C with at least one processor P and at least one memory M (or non-transitory, tangible computer readable medium) on which instructions may be recorded for selectively executing one or more modules 50 for managing the communications of the vehicle 12. The modules 50 include an Assessment Module 100 and an Automatic Deactivation Module 200, which are described below with respect to FIGS. 2-3, respectively.

The modules 50 are executed onboard for determining a confidence threshold for when it is acceptable to self-deactivate locally. As described below, the system 10 monitors a set of tasks to read specific vehicle parameters, identify connectivity states, identify functionality usage, and other indications that a telematics unit 14 has not been in use and should be deactivated. The assumption is the remote assistance unit 22 is unable to connect to the vehicle 12 to remotely disable.

When it is deemed possible to self-deactivate, a displayed message may warn the user 20 that the telematics unit 14 will be disabled and prompt the user 20 to make a button press if they still want to keep the subscription service 24. If there is no response, the telematics unit 14 may make a last call attempt to the remote assistance unit 22. If the call fails, the subscription service 24 may be disabled locally, while permitting a reconnection at a later point in time.

Understanding the state of the telematics unit 14 locally is beneficial for situations where there is a system fault, a network degradation, or simply lack of use by the user 20. The system 10 allows inoperable hardware from the vehicle 12 to be disabled. The system 10 provides better metrics to the remote assistance unit 22 on hardware status and subscription service status.

The modules 50 of FIG. 1 may be executed for the vehicle 12 individually or for a group of vehicles. Each of the modules 50 may be embodied as computer-readable code or instructions stored on and partially executable by the command unit 40 of FIG. 1. It is understood that the modules 50 are independent of one another. The modules 50 may be consecutively or concurrently executed by the command unit 40. The memory M may store controller-executable instruction sets, and the processor P may execute the controller-executable instruction sets stored in the memory M.

The command unit 40 may be hosted or based out of a remotely located cloud computing service 42, shown in FIG. 1. The cloud computing service 42 may include one or more remote servers hosted on the Internet to store, manage, and process data. The cloud computing service 42 may be at least partially managed by personnel at various locations. If the vehicle 12 is part of a fleet, the command unit 40 may be embedded in a master or leader vehicle.

Figure 2:
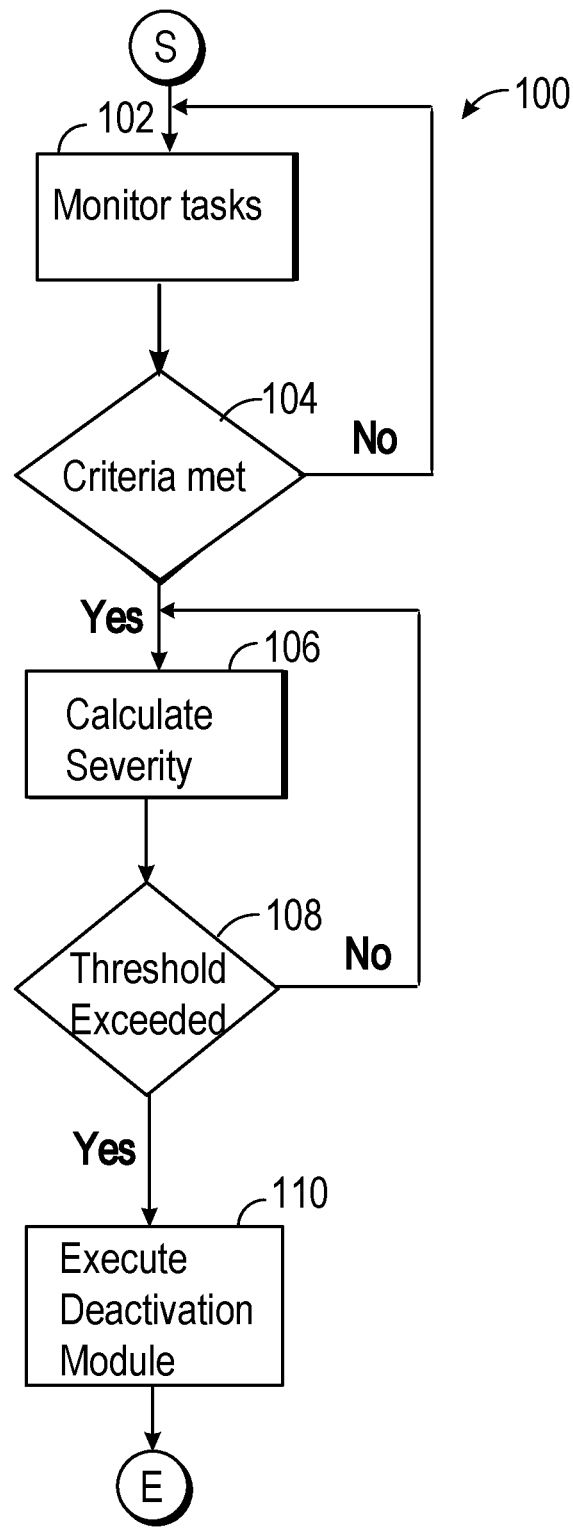
FIG. 2 is a flowchart for a module executable by the command unit of FIG. 1.

Referring now to FIG. 2, an example flowchart of the Assessment Module 100 is shown, which may be dynamically executed and need not be applied in the specific order recited herein. Furthermore, it is to be understood that some steps may be eliminated. Per block 102, the command unit 40 is programmed to monitor a set of tasks pertaining to connectivity, age, hardware and status of the vehicle 12. For example, the tasks may be saved in a vehicle electronic folder.

Proceeding to block 104, the command unit 40 determines if one or more deactivation conditions for the subscription service 24 are met. In other words, the system 10 looks at one or more deactivation conditions that indicate that the network may be sunset or that the vehicle 12 has been offline long enough to believe that the subscription service 24 should be disabled. A confidence threshold or cumulative severity index is built based on the number and type of deactivation conditions, as well as ranges of given parameters identified to increase the probability of future use.

The deactivation conditions may involve the vehicle age being above a maximum. The age of the vehicle 12 may be ascertained by checking the vehicle identification number (VIN). The deactivation conditions may pertain to a hardware damage issue. The hardware damage issue may include the status of signal receiving hardware, e.g., where an antenna 52 (see FIG. 1) in the vehicle 12 has been removed, damaged or shorted, resulting in the vehicle 12 being unreachable.

The deactivation conditions may pertain to expiry issues such as expiry of an end-of-life certificate (e.g., six years with a three year half-life), and/or expiry of a service agreement or warranty or connected state timer (e.g., 10 years, 8 years, 5 years, 3 years, etc.). In some embodiments, some deactivation conditions may be set as "required" to be met prior to the subscription service 24 being disabled (e.g., the end-of-life certificate has expired).

The deactivation conditions may pertain to dormancy issues such as the following: absence of a cellular service state and/or a radiofrequency band in the vehicle 12 for a predefined period; lack of usage of vehicle connectivity features such as Bluetooth™ and/or Hotspot; and failure of the telematics unit 14 to register with a network for a predefined extended time. The dormancy issues may include the vehicle 12 being in an ignition-off state and/or disconnected battery state for a predefined extended time. For example, a deactivation condition may be that the last service achieved (e.g., button press, data collection upload success or some type of connection to the remote assistance unit 22) by the vehicle 12 has exceeded a certain time period.

The deactivation conditions may involve network status or connectivity issues, such as the presence of a network rejection flag for a predetermined time duration and the presence of one or more permanent rejection flags. The deactivation conditions may include a number of deactivation attempts for the vehicle 12 exceeding a predetermined quantity, e.g., a maximum number of consecutive calls that fail a retry strategy. Each of the thresholds, predetermined quantities and predefined variables may be configurable and adjustable as per the application.

The deactivation conditions may include the vehicle 12 being restricted within a geographical boundary for a predefined length of time while the vehicle 12 has travelled a minimum distance during the predefined length of time. In other words, the miles driven by the vehicle 12 over a certain time meet a predetermined level, however the vehicle 12 has not left the geographical boundary or geofence area.

If one or more deactivation conditions are not met (block 104=NO), the Module 100 loops back to block 102. If one or more deactivation conditions are met (block 104=YES), the Module 100 proceeds to block 106 where the command unit 40 is adapted to determine respective severity values for the deactivation conditions.

The severity values (Si) for each of the i deactivation conditions indicate the extent, magnitude or scale of disruption of the deactivation conditions. In one embodiment, the severity value is selected to be a number between 0 and 100, inclusive. For example, the severity value is increased when the dormancy period increases.

Per block 106, the command unit 40 is adapted to calculate a cumulative severity index based in part on the respective severity values, e.g., as a sum of the respective severity values ($\Sigma_{i=1}^{n} Si$). In one embodiment, a respective weighting factor is assigned to the deactivation conditions and the cumulative severity index is obtained as a weighted sum of the respective severity values ($\Sigma_{i=1}^{n} Wi*Si$). The respective weighting factor (having a value between 0 and 1, inclusive) may be assigned based on the priorities of the application at hand. For example, the expiry of the end-of-life certificate may be given greater weight than a connectivity issue.

From block 106, the Module 100 proceeds to block 108 where the command unit 40 is adapted to determine whether a predefined severity threshold is exceeded. The predefined severity threshold may be adjusted based on the application at hand.

If the severity threshold is not exceeded (block 108=NO), the Module 100 loops back to block 106. If the severity threshold is exceeded (block 108=YES), the Module 100 proceeds to block 110 where the command unit 40 is adapted to execute the Automatic Deactivation Module 200 (shown in FIG. 3) and the Module 100 is ended.

Figure 3:
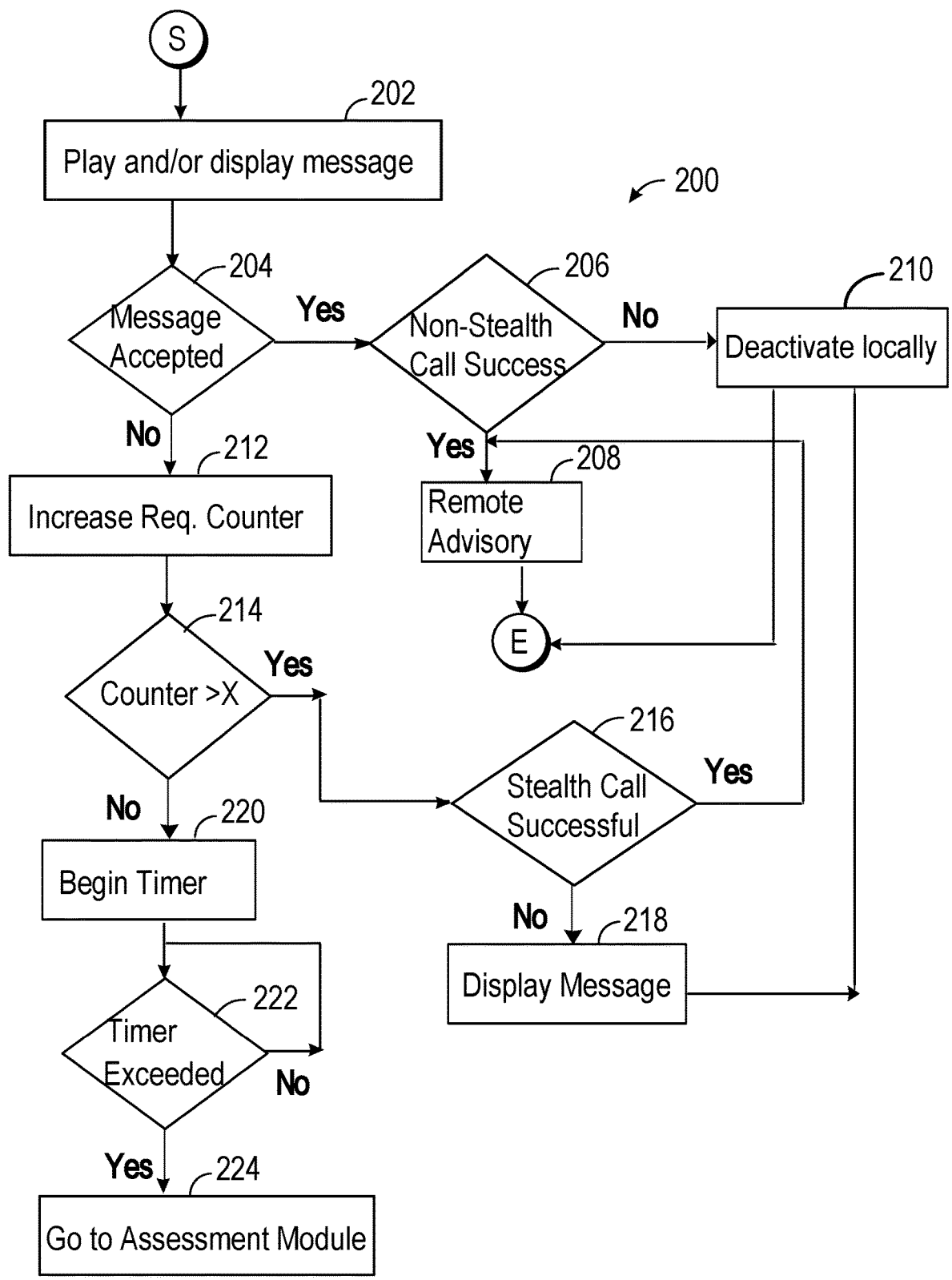
FIG. 3 is a flowchart for a second module executable by the command unit of FIG. 1.

Referring now to FIG. 3, an example flowchart of the Automatic Deactivation Module 200 is shown, which may be dynamically executed and need not be applied in the specific order recited herein. Furthermore, it is to be understood that some steps may be eliminated.

Per block 202 of FIG. 3, the command unit 40 is programmed to initiate the automated deactivation task by relaying a deactivation message in the vehicle 12, e.g., by playing an audible deactivation message and/or displaying a deactivation message. Advancing to block 204, the command unit 40 is adapted to determine if the deactivation message was accepted by a user 20 and/or a networking device in the vehicle 12.

If the deactivation message is accepted (block 204=YES), Module 200 advances to block 206 where the command unit 40 places a non-stealth call attempt, including up-selling or processing a normal deactivation. A non-stealth call has a voice connection (or text connection) and is deemed successful when the user 20 is responsive.

The Module 200 then determines if the attempt at the non-stealth call placement is successful. If the attempt at a non-stealth call placement is successful (block 206=YES), the Module 200 proceeds to block 208 where the remote assistance unit 22 determines the disposition of the deactivation, and the Module 200 is ended. If the attempt at a non-stealth call placement is not successful (block 206=NO), the Module 200 proceeds to block 210 where the subscription service 24 is locally deactivated in the vehicle 12.

If the deactivation message is not accepted (block 204=NO), the Module 200 proceeds to block 212 where a deactivation request counter is increased (or set up if none exists). The deactivation request counter records the number of attempts at executing the Module 200 within a predefined time. Proceeding from block 212 to block 214, the command unit 40 is adapted to determine whether the deactivation request counter exceeds a predefined counter threshold.

If the deactivation request counter exceeds the predefined counter threshold (block 214=YES), the Module 200 proceeds to block 216 where the command unit 40 attempts to place a stealth call to the vehicle 12. A stealth call involves a data connection or communication (machine-to-machine) without a voice connection. The stealth call is deemed successful if there is some response from the vehicle 12.

If the attempt at a non-stealth call placement is successful (block 216=YES), the Module 200 loops to block 208 where the disposition of the vehicle 12 is determined by the remote assistance unit 22. If the attempt at a non-stealth call placement is not successful (block 216=NO), the Module 200 proceeds to block 218 where the command unit 40 is adapted to display a forced deactivation message and Module 200 loops to block 210 where the subscription service 24 is locally deactivated.

If the deactivation request counter does not exceed the predefined counter threshold (block 214=NO), the Module 200 proceeds to block 220 where the command unit 40 is adapted to begin a timer (e.g., for 15 minutes). Advancing to block 222, the command unit 40 determines if the timer has expired. If the timer has not expired (block 222=NO), the Module 200 loops back to block 222. If the timer has expired (block 222=YES), the Module 200 proceeds to block 224 where the command unit 40 returns to execute the Assessment Module 100, described above relative to FIG. 2. Module 200 ends after block 208 and block 210.

In summary, the system 10 optimizes communications for motor vehicles. The system 10 enables notification to the customer to attempt to renew or activate their subscription service 24 when the remote assistance unit 22 is unable to reach a telematics unit 14 to deactivate the subscription service 24 through normal channels. If not acted upon or successful, the subscription service 24 is automatically disabled when one or more vehicle parameters or events are met based on dormancy state, connectivity conditions, service status, and more.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The command unit 40 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer may read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of managing communications between a vehicle and a remote assistance unit, the system comprising:
a telematics unit connected to the vehicle, the telematics unit being engaged in a subscription service with the remote assistance unit;
a command unit in communication with the telematics unit, the command unit having a processor and tangible, non-transitory memory on which instructions are recorded;
wherein the command unit is adapted to:
determine if one or more deactivation conditions for the subscription service are met;
determine respective severity values for the one or more deactivation conditions and calculate a cumulative severity index based in part on the respective severity values;

execute an automated deactivation module for the subscription service when the cumulative severity index exceeds a predefined severity threshold;
initiate the automated deactivation module by relaying a deactivation message in the vehicle and determine if the deactivation message was accepted by a user and/or a networking device in the vehicle;
attempt a non-stealth call to the vehicle when the deactivation message is accepted;
determine if the non-stealth call is successful and permit the remote assistance unit to determine disposition of the deactivation when the non-stealth call is successful; and
locally deactivate the subscription service in the vehicle when the non-stealth call is not successful.

2. The system of claim 1, wherein the command unit is adapted to:
assign a respective weighting factor to the one or more deactivation conditions; and
obtain the cumulative severity index as a weighted sum of the respective severity values.

3. The system of claim 1, wherein the one or more deactivation conditions include at least one of:
expiry of an end-of-life certificate; and
expiry of a connected state timer and/or service agreement.

4. The system of claim 1, wherein the one or more deactivation conditions include at least one of:
an age of the vehicle exceeding a maximum; and
damage to hardware in the vehicle, the hardware including at least one antenna.

5. The system of claim 1, wherein the one or more deactivation conditions includes at least one of:
absence of a cellular service state and/or a radiofrequency band in the vehicle for a predefined period;
lack of usage of vehicle connectivity features, including Bluetooth™ and/or Hotspot; and
failure of the telematics unit to register with a network for a predefined extended time.

6. The system of claim 1, wherein the one or more deactivation conditions includes at least one of:
the vehicle being in an ignition-off state and/or disconnected battery state for a predefined extended time; and
the vehicle being restricted within a geographical boundary for a predefined length of time while the vehicle has travelled a minimum distance during the predefined length of time.

7. The system of claim 1, wherein the one or more deactivation conditions includes at least one of:
presence of a network rejection flag for a predetermined time duration; presence of one or more permanent rejection flags; and
a number of deactivation attempts for the vehicle exceeding a predetermined quantity.

8. The system of claim 1, wherein the command unit is adapted to:
increase a deactivation request counter when the deactivation message is not accepted; and
determine whether the deactivation request counter exceeds a predefined counter threshold.

9. The system of claim 8, wherein the command unit is adapted to:
place a stealth call to the vehicle when the deactivation request counter exceeds the predefined counter threshold;
begin a timer when the deactivation request counter does not exceed the predefined counter threshold; and
when the timer has expired, reassess if one or more deactivation conditions for the subscription service are met.

10. The system of claim 9, wherein the command unit is adapted to:
permit disposition of the subscription service to be determined by the remote assistance unit when the stealth call is successful; and
display a forced deactivation message and locally deactivate the telematics unit when the stealth call is not successful.

11. A method of managing communication between a vehicle and a remote assistance unit, the method comprising:
installing a telematics unit in the vehicle, the telematics unit being engaged in a subscription service with the remote assistance unit;
communicating with a command unit via the telematics unit, the command unit having a processor and tangible, non-transitory memory on which instructions are recorded;
determining if one or more deactivation conditions for the subscription service are met, via the command unit;
determining respective severity values for the one or more deactivation conditions and calculating a cumulative severity index based in part on the respective severity values, via the command unit;
executing an automated deactivation module for the subscription service when the cumulative severity index exceeds a predefined severity threshold via the command unit;
initiating the automated deactivation module by relaying a deactivation message in the vehicle and determine if the deactivation message was accepted by a user and/or a networking device in the vehicle;
attempting a non-stealth call to the vehicle when the deactivation message is accepted;
determining if the non-stealth call is successful and permitting the remote assistance unit to determine disposition of the deactivation when the non-stealth call is successful; and
locally deactivating the subscription service in the vehicle when the non-stealth call is not successful.

12. The method of claim 11, further comprising:
increasing a deactivation request counter when the deactivation message is not accepted; and
determining whether the deactivation request counter exceeds a predefined counter threshold.

13. The method of claim 12, further comprising:
placing a stealth call to the vehicle when the deactivation request counter exceeds the predefined counter threshold;
beginning a timer when the deactivation request counter does not exceed the predefined counter threshold; and
when the timer has expired, reassessing if one or more deactivation conditions for the subscription service are met.

14. The method of claim 13, further comprising:
determining disposition of the vehicle through the remote assistance unit when the stealth call is successful; and
displaying a forced deactivation message and locally deactivate the telematics unit when the stealth call is not successful.

* * * * *